United States Patent
Agarwal et al.

(10) Patent No.: US 8,468,507 B2
(45) Date of Patent: Jun. 18, 2013

(54) BINDING EXECUTABLE CODE AT RUNTIME

(75) Inventors: Amit Kumar Agarwal, Bellevue, WA (US); Weirong Zhu, Issaquah, WA (US); Yosseff Levanoni, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 167 days.

(21) Appl. No.: 13/158,226

(22) Filed: Jun. 10, 2011

(65) Prior Publication Data

US 2012/0317558 A1 Dec. 13, 2012

(51) Int. Cl.
*G06F 9/45* (2006.01)

(52) U.S. Cl.
USPC ............ 717/140; 717/137; 717/147; 717/151

(58) Field of Classification Search
None
See application file for complete search history.

(56) References Cited

U.S. PATENT DOCUMENTS

| | | | | |
|---|---|---|---|---|
| 5,339,419 A * | 8/1994 | Chan et al. | ..................... | 717/147 |
| 5,339,430 A | 8/1994 | Lundin | | |
| 6,665,865 B1 | 12/2003 | Ruf | | |
| 6,748,587 B1 * | 6/2004 | Santhanam et al. | .......... | 717/140 |
| 6,961,840 B2 | 11/2005 | Fleming | | |
| 7,463,259 B1 | 12/2008 | Kolb | | |
| 7,793,272 B2 * | 9/2010 | Andrews et al. | ............... | 717/136 |
| 2004/0221278 A1 * | 11/2004 | Dankel et al. | .................. | 717/139 |
| 2004/0221280 A1 * | 11/2004 | Bolton et al. | .................. | 717/151 |
| 2006/0206880 A1 * | 9/2006 | Barraclough et al. | ........ | 717/140 |
| 2006/0230223 A1 | 10/2006 | Kruger et al. | | |
| 2006/0277532 A1 * | 12/2006 | Barraclough et al. | ........ | 717/137 |
| 2007/0006184 A1 * | 1/2007 | Andrews et al. | ............... | 717/136 |
| 2007/0288721 A1 | 12/2007 | Kruger et al. | | |
| 2008/0276261 A1 | 11/2008 | Munshi et al. | | |
| 2008/0276262 A1 | 11/2008 | Munshi et al. | | |
| 2009/0024986 A1 | 1/2009 | Meijer | | |
| 2009/0070753 A1 | 3/2009 | Chen | | |
| 2009/0100416 A1 | 4/2009 | Brown et al. | | |
| 2009/0300590 A1 * | 12/2009 | Moritz | ........................... | 717/140 |
| 2009/0328013 A1 | 12/2009 | Aharoni et al. | | |
| 2010/0026692 A1 | 2/2010 | Lew et al. | | |
| 2010/0299658 A1 * | 11/2010 | Ng et al. | ........................ | 717/140 |
| 2010/0299660 A1 | 11/2010 | Torgersen | | |
| 2012/0324430 A1 | 12/2012 | Agarwal | | |

OTHER PUBLICATIONS

Xiaohua Shi, "Design a High-Performance Just-In-Time Compiler for a J2ME JVM on XScaleTM1", School of Computer Science Beihang University, Jul. 2008, 8 pages, <http://ieeexplore.ieee.org/stamp/stamp.jsp?tp=&arnumber=4595594>.*

(Continued)

*Primary Examiner* — Thuy Dao
*Assistant Examiner* — Khanh Dang
(74) *Attorney, Agent, or Firm* — Workman Nydegger

(57) ABSTRACT

The present invention extends to methods, systems, and computer program products for binding executable code at runtime. Embodiments of the invention include late binding of specified aspects of code to improve execution performance. A runtime dynamically binds lower level code based on runtime information to optimize execution of a higher level algorithm. Aspects of a higher level algorithm having a requisite (e.g., higher) impact on execution performance can be targeted for late binding. Improved performance can be achieved with minimal runtime costs using late binding for aspects having the requisite execution performance impact.

19 Claims, 4 Drawing Sheets

OTHER PUBLICATIONS

Ung, D., "Dynamic re-engineering of binary code with run-time feedbacks", University of Queensland, QLD, Australia, 2000, 9 pages, <http://ieeexplore.ieee.org/stamp/stamp.jsp?tp=&arnumber=891447>.*

Mikyung Kang, "Design and Development of a Run-Time Monitor for Multi-Core Architectures in Cloud Computing", Information Sciences Institute (ISI), Mar. 2011, 16 pages, <http://ip.com/pdf/pmc/PMC3231313.pdf>.*

Joseph P. Loyall, "QoS Aspect Languages and Their Runtime Integration", BBN Technologies, 1998, 16 pages, <http://www.dist-systems/bbn/com>.*

Meier, J.D., et al., "Chapter 5—Improving Managed Code Performance", May 2004, 42 pages.

Poletto, Massimiliano, et al., "'C and tcc: A Language and Compiler for Dynamic Code Generation", Oct. 1997, 47 pages.

Clarberg, Petrik, et al., "An Optimizing Compiler for Automatic Shader Bounding", 2010, 10 pages.

Hargreaves, Shawn, "Generating Shaders From HLSL Fragments", Based on information and belief available, at least as early as Jan. 3, 2011, 12 pages.

Parker, Steven G., et al., "RTSL: a Ray Tracing Shading Language", IEEE/EG Symposium on Interactive Ray Tracing 2007, pp. 149-160.

Apple Computer, Inc., "Framework Programming Guide", Nov. 7, 2006, 58 pages.

Gorbovitski, Michael, et al., "Alias Analysis for Optimization of Dynamic Languages", Oct. 2010, 15 pages.

Horwitz, Susan, "Precise Flow-Insensitive May-Alias Analysis is NP-Hard", ACM Transactions on Programming Languages and Systems, vol. 19, No. 1, Jan. 1997, pp. 1-6.

Robison, Arch D., "Impact of Economics on Compiler Optimization", Based on information and belief available, at least as early as Jan. 6, 2011, 10 pages.

* cited by examiner

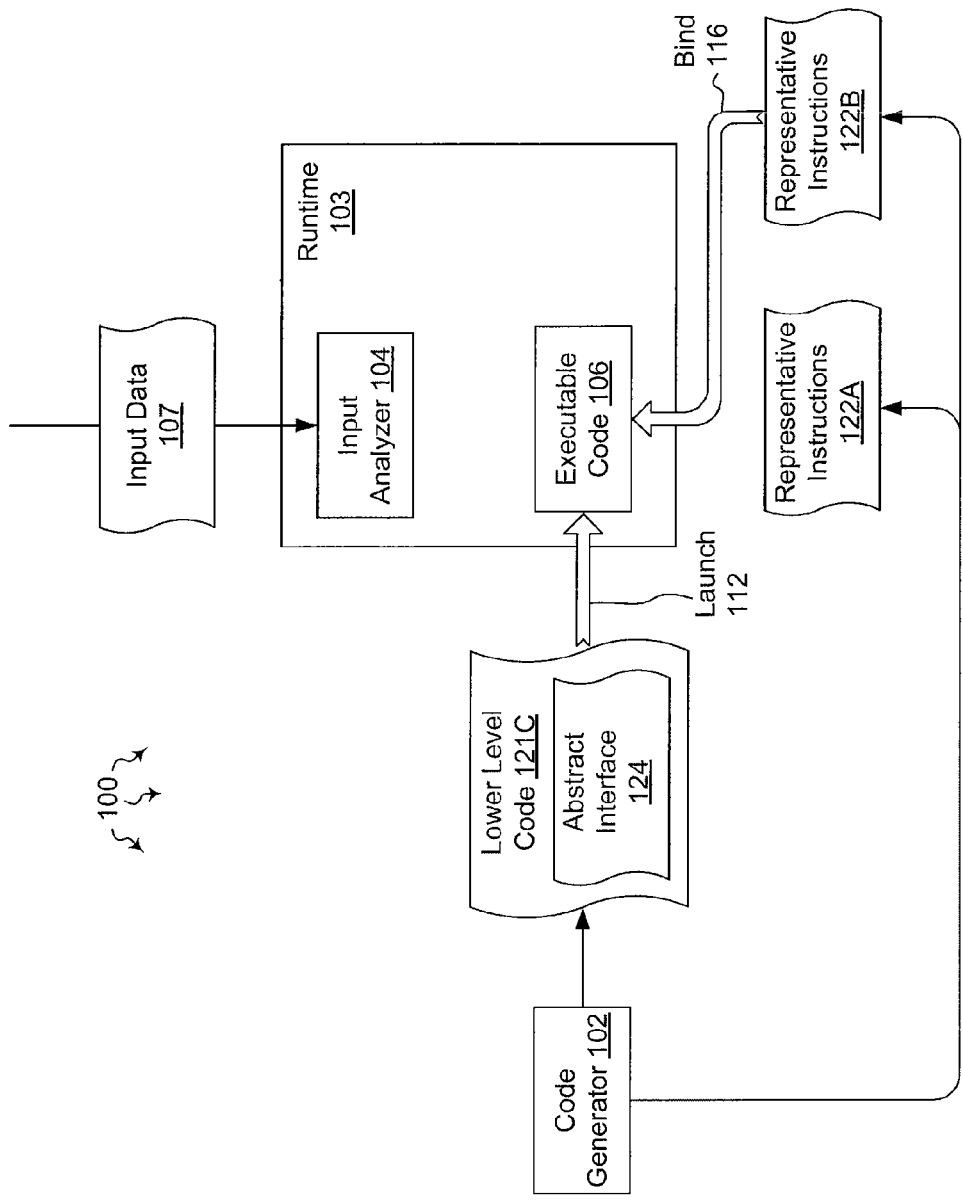

BINDING EXECUTABLE CODE AT RUNTIME

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

One mechanism for generating executable code is compilation. At compile time, a compiler receives a source level description of an algorithm written in a higher level programming language. The compiler is tasked with generating executable code for a target environment from the source level description. At runtime, the executable code is run in the target environment.

Typically, only partial and cursory information is available about the algorithm inputs at compile time. Thus, the compiler cannot make any assumptions about many aspects of the algorithm inputs, such as, for example, the size of the inputs. As such, the compiler typically generates executable code that is capable of handling all possible inputs at runtime. Unfortunately, the generality of compiled executable code comes at the cost of sub-optimal performance. For example, during execution, some of the executed instructions may be redundant for a specified input and more system resources (such as memory and registers) may be consumed than required for handling the specific input.

Another mechanism for executing code is interpretation. An interpreter receives an algorithm written in a higher level programming language and interprets the algorithm for direct execution. Interpreted languages can address to some extent the sub-optimal performance of compiled code. However, re-interpretation of the algorithm for each run often outweighs the benefits of generating more optimized code.

Just-in-time ("JIT") compilation technique includes runtime translation of intermediate code output from a complier to targeted machine executable code. As part of this runtime translation (or just-in-time compilation) various optimizations can be used to generate and execute more efficiently performing code, which is tailored to the specific inputs observed during execution. However, JIT based systems compile the entire code at runtime, paying a greater runtime overhead or the translation.

BRIEF SUMMARY

The present invention extends to methods, systems, and computer program products for binding executable code at runtime. Embodiments of the invention include mechanisms for a compiler and runtime to interoperate to achieve improved code performance based on runtime information. Statements and expressions of higher level source code are accessed. It is detected that the higher level source code includes at least one specified aspect for which the execution efficiency of corresponding representative lower instructions varies to a requisite extent dependent upon the configuration of input data received during execution.

The statements and expressions of the accessed higher level source code are compiled into representative lower level instructions of the lower level code. Compilation includes compiling a plurality of different representative lower level instructions for the at least one specified aspect. Each of the plurality of different representative lower level instructions is configured to correctly implement the intent of the at least one specified aspect. At least one of the plurality of different representative lower level instructions is optimized for execution efficiency based on a different configuration of received input data.

Execution of the lower level instructions is configured at runtime. The configuration of input data to be provided to the at least one specified aspect of the higher level source code is analyzed. It is determined that specified representative lower level instructions, selected from among the plurality of different representative lower level instructions, are optimized for execution based on the configuration of the provided input data. The specified lower level instructions are bound to executable code to implement the intent of the at least one specified aspect of the higher level source code.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1C illustrates using an abstract interface to bind executable code at runtime.

DETAILED DESCRIPTION

Figure 1A:
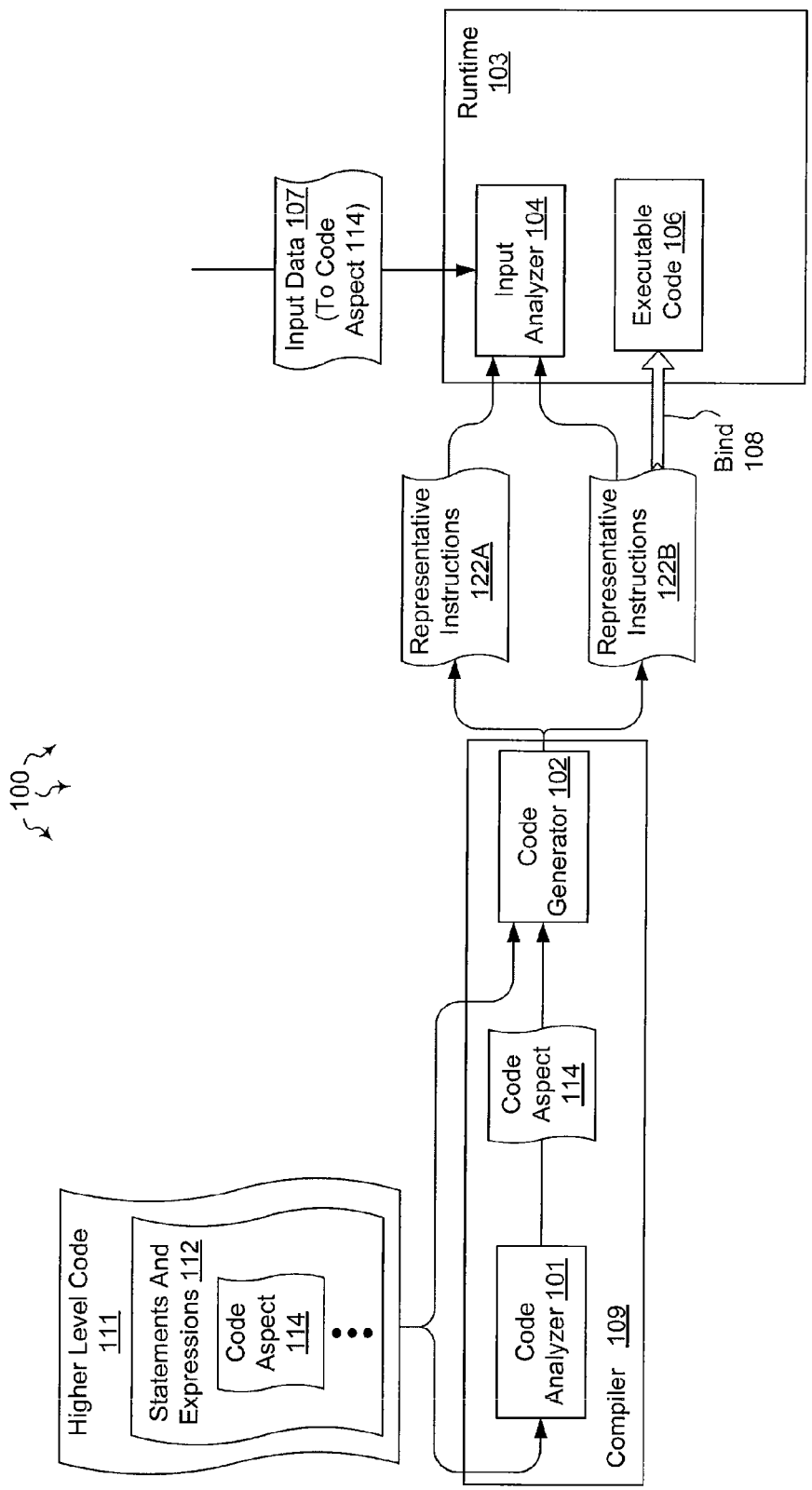
FIG. 1A illustrates an example computer architecture that facilitates binding executable code at runtime

The present invention extends to methods, systems, and computer program products for binding executable code at runtime. Embodiments of the invention include mechanisms for a compiler and runtime to interoperate to achieve improved code performance based on runtime information. Statements and expressions of higher level source code are accessed. It is detected that the higher level source code includes at least one specified aspect for which the execution efficiency of corresponding representative lower instructions varies to a requisite extent dependent upon the configuration of input data received during execution.

The statements and expressions of the accessed higher level source code are compiled into representative lower level instructions of the lower level code. Compilation includes compiling a plurality of different representative lower level instructions for the at least one specified aspect. Each of the plurality of different representative lower level instructions is configured to correctly implement the intent of the at least one specified aspect. At least one of the plurality of different representative lower level instructions is optimized for execution efficiency based on a different configuration of received input data.

Execution of the lower level instructions is configured at runtime. The configuration of input data to be provided to the at least one specified aspect of the higher level source code is analyzed. It is determined that specified representative lower level instructions, selected from among the plurality of different representative lower level instructions, are optimized for execution based on the configuration of the provided input data. The specified lower level instructions are bound to executable code to implement the intent of the at least one specified aspect of the higher level source code.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including combinations having one or more of: personal computers, desktop computers, laptop computers, message processors, hand-held devices, multi-processor systems (including systems with a one or more Central Processing Units ("CPUs") and one or more co-processors, for example, Graphical Processing Units ("GPUs") or accelerators), microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include late binding of specified aspects of code to improve execution performance. A runtime dynamically binds lower level code based on runtime information to optimize execution of a higher level algorithm. Aspects of a higher level algorithm having a requisite (e.g., higher) impact on execution performance can be targeted for late binding. Improved performance can be achieved with minimal runtime costs using late binding for aspects having the requisite impact on execution performance.

A variety of dynamic binding techniques can be used. In some embodiments, a plurality of different versions of executable code is generated for a higher level aspect. Each of the plurality of different versions includes lower level code correctly implementing the higher level aspect. Each of the plurality of different versions is optimized for execution based on a different configuration of input data corresponding to the higher level aspect. At runtime, an optimized version of the lower level code is selected based on received input data.

In other embodiments, an abstract interface for a higher level aspect is generated. At runtime, an optimized concrete implementation of the higher level aspect is bound to the abstract interface based on received input data.

A wide variety of different higher level aspects may have a requisite impact on executable code performance, including but not limited to: buffer aliasing and logical thread index mapping. Embodiments of the invention can be used to optimize execution of these and other higher level aspects by binding executable code at runtime based on runtime input data.

FIG. 1 illustrates an example computer architecture 100 that facilitates binding executable code at runtime. Referring to FIG. 1, computer architecture 100 includes compiler 109 and runtime 103. Each of the depicted components is connected to one another over (or is part of) a system bus and/or a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

As depicted, compiler 109 includes code analyzer 101 (e.g., a compiler front end) and code generator 102 (e.g., a compiler back end). Code analyzer 101 is configured to receive statements and expressions of higher level code (e.g., written in C++, C++ extended for parallel environments, Visual Basic, etc.). Code analyzer 101 can analyze the statements and expressions of higher level code to identify aspects having a requisite impact on performance of representative lower level instructions. For example, code analyzer 101 can determine that buffer use (which many or may not be aliased) has a requisite impact on performance or that physical to logical thread mappings (which may be direct or indirect) has a requisite impact on performance. Based on runtime input data, optimized lower level code representing identified aspects can vary. As such, code analyzer 101 indicates any identified aspects to code generator 102.

Code generator 102 is configured to receive statements and expression of higher level code and indentified aspects having the requisite impact on representative lower level instruction performance. From the statements and expressions and identified aspects, code generator 102 can generate a plurality of different lower level instructions (e.g., DirectX/High Level Shader Language ("HLSL") bytecode) that correctly implement the requisite aspects. Each of the plurality of different lower level instructions can be optimized for a specified configuration of received runtime input data. For example, when buffers are used, one version of lower level code can be optimized for non-aliased buffer access and another version of lower level code can be sub-optimal for implementing the general scenario of aliasing among input/output buffers. Similarly, when physical to logical thread mappings are used, one version of lower level code can be optimized for direct mappings and another version of lower level code can be provided to handle the more general but less efficient case of indirect mapping.

Generally, runtime 103 is configured to execute lower level code to implement the intent of statements and expressions of higher level code. As depicted, runtime 103 includes input analyzer 104. Analyzer 104 is configured to determine the configuration of input data to be provided to identify aspects. Input analyzer 104 can determine that specified lower level instructions are optimized for execution in runtime 103 based on the configuration of the input data. For example, representative lower level code can be selected for aliased or non-aliased buffer access or direct or indirect physical to logical thread mappings. Runtime 103 can bind the specified lower level instructions to executable code for execution in runtime 103.

Figure 2:
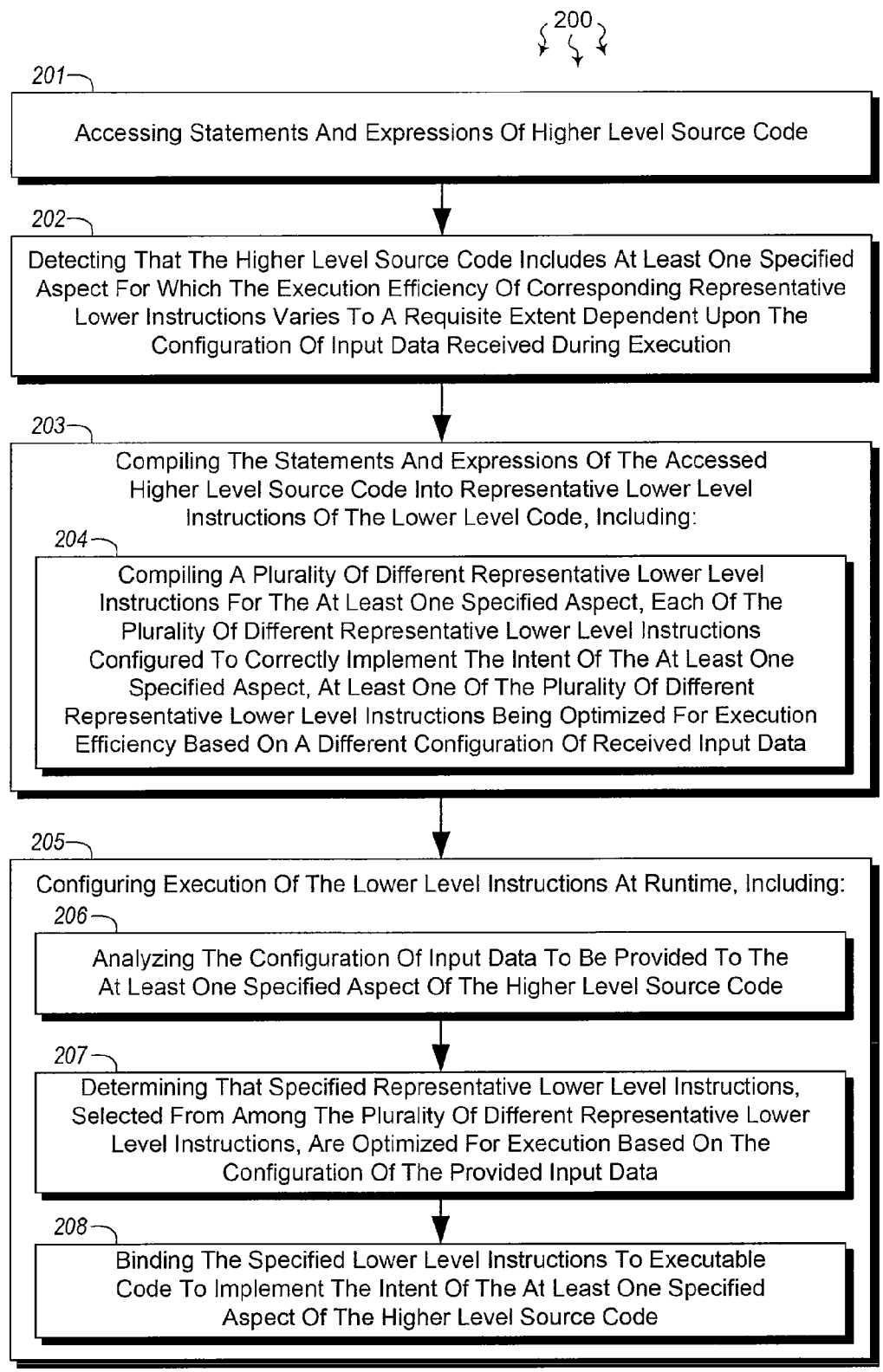
FIG. 2 illustrates a flow chart of an example method for binding executable code at runtime.

FIG. 2 illustrates a flow chart of an example method 200 for binding executable code at runtime. Method 200 will be described with respect to the components and data of computer architecture 100.

Method 200 includes an act of accessing statements and expressions of higher level source code (act 201). For example, code analyzer 101 can access statements and expressions 112 of higher level code 111 (e.g., C++ extended for parallel environments). Method 200 includes an act of detecting that the higher level source code includes at least one specified aspect for which the execution efficiency of corresponding representative lower instructions varies to a requisite extent dependent upon the configuration of input data received during execution (act 202). For example, code analyzer 101 can detect that code aspect 114 impacts the execution efficiency of representative lower level instructions to a requisite extent based on the configuration of input to code aspect 114.

Code analyzer 101 indicates code aspect 114 to code generator 102. Complier receives the indication of code aspect 114. Code generator 102 also accesses higher level code 111.

Method 200 includes an act of compiling the statements and expressions of the accessed higher level source code into representative lower level instructions of the lower level code (act 203). For example, code generator 102 compiles statements and expressions 112 into representative instructions of lower level code (e.g., DirectX/High Level Shader Language ("HLSL") bytecode).

Act 203 includes an act of compiling a plurality of different representative lower level instructions for the at least one specified aspect, each of the plurality of different representative lower level instructions configured to correctly implement the intent of the at least one specified aspect, at least one of the plurality of different representative lower level instructions being optimized for execution efficiency based on a different configuration of received input data (act 204). For example, code generator 102 can compile statements expressions 112 into representative instructions 122A and 122B. Each of representative instructions 122A and 122B are configured to correctly implement the intent of code aspect 114 for different input data configurations. Each of representative instructions 122A and 122B are optimized for execution efficiency based on a different configuration of input for code aspect 114.

In some embodiments, one or more optimized versions and a more generalized "catch all" version of lower level instructions are generated. Each of the one or more optimized versions is optimized for a particular circumstance, such as, for example, a specified configuration of input. The catch all version handles any other cases. Thus, collectively, the one or more optimized versions and the catch all version can handle any possible case from an original algorithm. Method 200 includes an act of configuring execution of the lower level instructions at runtime (act 205). For example, runtime 103 configures the execution of executable code 106 at runtime. Act 205 includes an act of analyzing the configuration of input data to be provided to the at least one specified aspect of the higher level source code (act 206). For example, input analyzer 104 can analyze input data 107 (that is to be provided to code aspect 114).

Act 205 includes an act of determining that specified representative lower level instructions, selected from among the plurality of different representative lower level instructions, are optimized for execution based on the configuration of the provided input data (act 207). For example, input analyzer 104 (or some other module in runtime 103) can determine that representative instructions 122B are optimized for execution based on the configuration of input data 107. Act 205 includes an act of binding the specified lower level instructions to executable code to implement the intent of the at least one specified aspect of the higher level source code (act 208). For example, runtime 103 can bind 108 representative code 122B to executable code 106 to implement the intent of code aspect 114.

Figure 1B:
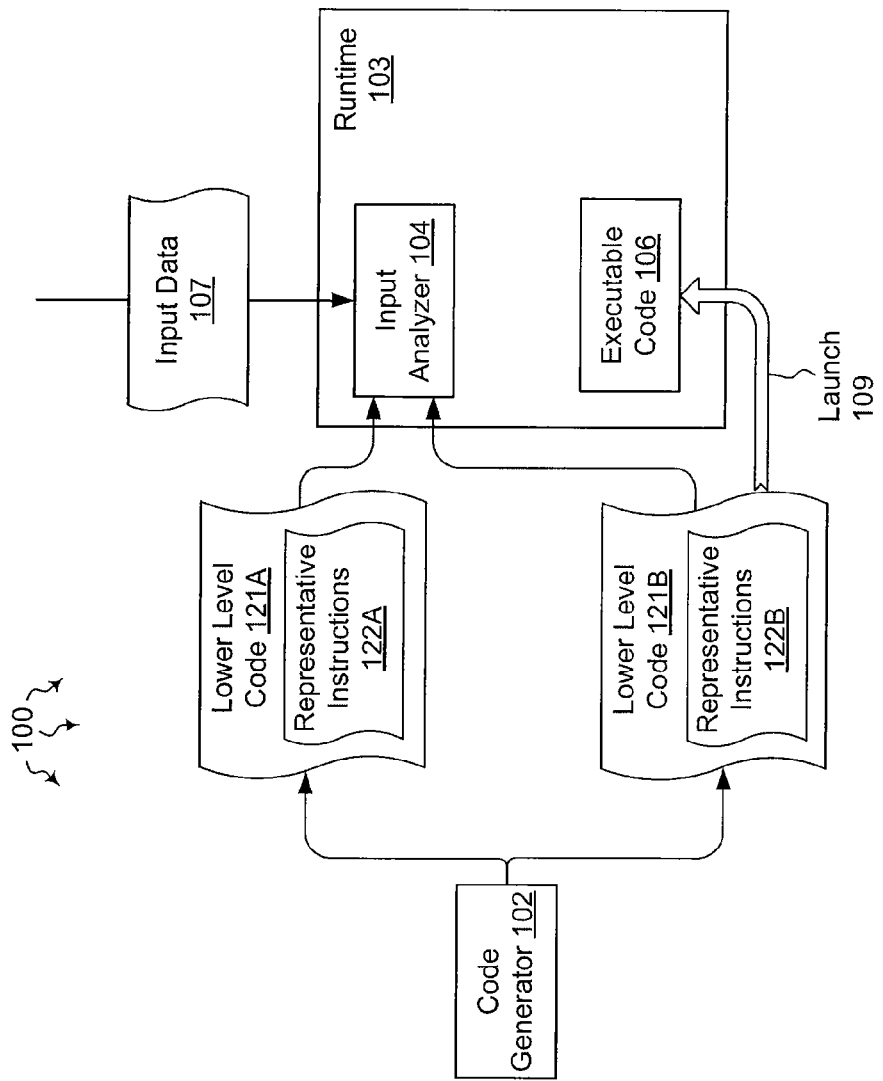
FIG. 1B illustrates using multiple versions of lower level code to bind executable code at runtime.

A plurality of different representative lower level instructions can be generated in a variety of ways. Binding representative lower level instructions at runtime can also vary. Turning to FIG. 1B, FIG. 1B illustrates using multiple versions of lower level code to bind executable code at runtime. As depicted in FIG. 1B, code generator 102 generates lower level code 121A including representative instructions 122A and lower level code 121B including representative instructions 122B. At runtime, based on analysis of input data 107, runtime 103 can launch 109 lower level code 121B as executable code 106.

Embodiments of using multiple versions of lower level code include generating multiple HLSL shaders from C++ extended for parallel environments code. For example, in the context of buffer aliasing, code generator 102 can generate one shader version (e.g., representative instructions 122A) which assumes that there is (and is optimized for) no aliasing at runtime and another shader version (e.g., representative instructions 122B) which handles aliasing of buffers. At runtime, runtime 103 checks for aliasing among the buffer parameters to the kernel and invokes the appropriate shader version.

In the context of thread mapping, code generator 102 can generate one shader version which assumes that there is (and is optimized for) direct thread mapping and another shader which handles indirect thread mapping. At runtime, runtime 103 checks for direct/indirect thread mapping and invokes the appropriate shader version.

Turning to FIG. 1C, FIG. 1C illustrates using an abstract interface to bind executable code at runtime. As depicted in FIG. 1C, code generator 102 generates lower level code 121C including abstract interface 124. Representative instructions 122A and 122B are concrete implementations of abstract interface 124. Representative instructions 122A and 122B can exist from previous compilation or can be generated along with abstract interface 124. Representative instructions 122A and 122B represent different portions of lower level code that can be dynamically linked to implement abstract interface 124 at runtime. At runtime, runtime 103 launches 112 lower level code 121C as executable code 106. Based on analysis of input data 107, runtime 103 can bind representative instructions 122B to executable code 106 to provide a concrete implementation of abstract interface 124.

Embodiments of using an abstract interface include DirectX/HLSL defining an abstract interface that can be used in HLSL code. Binding the interface to actual code can be delayed until runtime. For example, in the context of physical to logical thread index mapping context, code generator 102 can generate HLSL bytecode that utilizes an abstract interface for mapping the physical thread IDs to the C++ logical thread IDs. The abstract interface is bound to direct mapping code (e.g., representative instructions 122A) or indirect mapping code (e.g., representative instructions 122B) based on the actual compute domains specified at runtime.

In the context of buffer aliasing, code generator 102 can generate HLSL bytecode that utilizes an abstract interface for handling buffers at runtime. The abstract interface is bound to code using aliased buffers or code using non-aliased buffers based on whether or not aliasing among the buffer parameters to the kernel is detected at runtime.

Further embodiments include generating multiple shaders for hardware dependent features present in user code. One shader can take advantage of the hardware features and another shader can use a less efficient fallback implementation. At runtime, an appropriate shader is selected for execution based on the hardware capabilities of the target processor determined at runtime.

Additional embodiments include generating multiple shaders, each shader varying optimization choices for code generation and accordingly varying resource requirements. At runtime, an appropriate shader can be selected for execution based on the resource availability on the target hardware. These additional embodiments may be useful when hardware resources, such as, for example, the number of registers vary across hardware.

Multiple versions of a shader can also be generated to handle different runtime configurations, such as, for example, capabilities of the execution hardware. For example, embodiments include generating multiple shaders (versions of executable code) for different target processors. At runtime, an appropriate shader is selected for execution based on the target processor selected for execution.

Other embodiments for handling different runtime configurations include generating multiple shaders with some of the shaders including instrumentation code to aid profiling/debugging at the expense of slower execution. This offers a runtime choice for running the instrumented or non-instrumented code without the need for recompilation. At runtime, an appropriate shader can be selected based on whether or not profiling/debugging is selected.

Abstract interfaces can be used in combination with multiple code versions. Some inputs are then serviced by different interface implementations, while other inputs are served by completely different code versions, which do not employ an interface or employ different interfaces.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a processor and system memory, the computer system also including a compiler and a runtime, the compiler configured to compile statements and expressions of higher level source code into representative lower level instructions of lower level code, the runtime configured to execute executable code, a method for binding code at runtime to improve performance, the method comprising:

an act of accessing statements and expressions of higher level source code;

an act of detecting that the higher level source code includes at least one specified aspect for which the execution efficiency of corresponding representative lower instructions varies to a requisite extent dependent upon the configuration of input data received during execution;

an act of compiling the statements and expressions of the accessed higher level source code into representative lower level instructions of the lower level code, including: an act of compiling a plurality of different representative lower level instructions for the at least one specified aspect comprises: an act of compiling an abstract interface to represent the at least one specified aspect; and an act of compiling a plurality of different portions of lower level code that can be dynamically linked to the abstract interface at runtime, each of the plurality of different representative lower level instructions configured to correctly implement the intent of the at least one specified aspect, at least one of the plurality of different representative lower level instructions being optimized for execution efficiency based on a different configuration of received input data;

an act of configuring execution of the lower level instructions at runtime, including: an act of analyzing the configuration of input data to be provided to the at least one specified aspect of the higher level source code;

an act of determining that specified representative lower level instructions, selected from among the plurality of different representative lower level instructions, are optimized for execution based on the configuration of the provided input data;

and an act of binding the specified lower level instructions to executable code to implement the intent of the at least one specified aspect of the higher level source code.

2. The method as recited in claim 1, wherein the act of compiling the statements and expressions of the accessed higher level source code into representative lower level instructions of the lower level code comprises an act of compiling C++ code into High Level Shader Language ("HLSL") bytecode, the C++ code including extensions for parallel environments.

3. The method as recited in claim 2, wherein the act of compiling a plurality of different representative lower level instructions for the at least one specified aspect comprises an act of compiling a plurality of different versions of a shader for the C++ code, at least one of the plurality of different versions of the shader optimized for a specific configuration of input data.

4. The method as recited in claim 1, wherein the act of compiling a plurality of different representative lower level instructions for the at least one specified aspect comprises:

an act of compiling one version of representative lower level instructions optimized for use with input data that does not use buffer aliasing at runtime; and an act of compiling another version of representative lower level instructions for use with input data that does use buffer aliasing at runtime.

5. The method as recited in claim 4, wherein an act of analyzing the configuration of input data to be provided to the at least one specified aspect of the higher level source code comprises an act of determining that the input data does not use buffer aliasing; and wherein the act of binding the specified lower level instructions to executable code to implement the intent of the at least one specified aspect of the higher level source code comprises an act of binding the one version of representative lower level instructions to executable code at runtime.

6. The method as recited in claim 4, wherein the one version of representative lower level instructions and the other version of representative lower level instructions are both High Level Shader Language ("HLSL") shaders.

7. The method as recited in claim 1, wherein the act of compiling an abstract interface to represent the at least one specified aspect comprises an act of compiling a physical to logical thread ID mapping interface; and wherein the act of compiling a plurality of different portions of lower level code that can be dynamically linked to the abstract interface at runtime comprises:

an act of compiling one portion of lower level code for direct physical to logical thread ID mapping; and an act of compiling another portion of lower level code for the more general indirect physical to logical thread ID mapping.

8. The method as recited in claim 1, wherein an act of analyzing the configuration of input data to be provided to the at least one aspect of the higher level source code comprises an act of determining that the input data allows using direct physical to logical thread ID mapping; and wherein the act of binding the specified lower level instructions to executable code to implement the intent of the at least one aspect of the higher level source code comprises an act of dynamically linking the one portion of lower level code to the physical to the logical thread ID mapping interface at runtime.

9. A computer program product for use at a computer system, the computer system including a compiler and a runtime, the compiler configured to compile statements and expressions of higher level source code into representative lower level instructions of lower level code, the runtime configured to execute executable code, the computer program product for a method for binding code at runtime to improve performance, the computer program product for comprising one or more computer storage devices having stored thereon computer-executable instructions that, when executed at a processor, cause the computer system to perform the method including the following:

access statements and expressions of higher level source code;

detect that the higher level source code includes at least one specified aspect for which the execution efficiency of corresponding representative lower instructions varies to a requisite extent dependent upon the configuration of input data received during execution;

compile the statements and expressions of the accessed higher level source code into representative lower level instructions of the lower level code, including: compile a plurality of different representative lower level instructions for the at least one specified aspect comprises: an act of compiling an abstract interface to represent the at least one specified aspect; and an act of compiling a plurality of different portions of lower level code that can be dynamically linked to the abstract interface at runtime, each of the plurality of different representative lower level instructions configured to correctly implement the intent of the at least one specified aspect, each of the plurality of different representative lower level instructions being optimized for execution efficiency based on a different configuration of received input data;

configure execution of the lower level instructions at runtime, including: analyze the configuration of input data to be provided to the at least one specified aspect of the higher level source code;

determine that specified representative lower level instructions, selected from among the plurality of different representative lower level instructions, are optimized for execution based on the configuration of the provided input data;

and bind the specified lower level instructions to executable code to implement the intent of the at least one specified aspect of the higher level source code.

10. The computer program product as recited in claim 9, wherein computer-executable instructions that, when executed, cause the computer system to compile the statements and expressions of the accessed higher level source code into representative lower level instructions of the lower level code comprise computer-executable instructions that, when executed, cause the computer system to compile C++ code into High Level Shader Language ("HLSL") bytecode, the C++ code including extensions for parallel environments.

11. The computer program product as recited in claim 10, wherein computer-executable instructions that, when executed, cause the computer system to compile a plurality of different representative lower level instructions for the at least one specified aspect comprise computer-executable instructions that, when executed, cause the computer system to compile a plurality of different versions of a shader for the C++ code, at least one of the plurality of different versions of the shader optimized for a specific configuration of input data.

12. The computer program product as recited in claim 9, wherein computer-executable instructions that, when executed, cause the computer system to compile a plurality of different representative lower level instructions for the at least one specified aspect comprise computer-executable instructions that, when executed, cause the computer system to:

compile one version of representative lower level instructions optimized for use with input data that does not use buffer aliasing at runtime; and compile another version of representative lower level instructions for use with input data that does use buffer aliasing at runtime.

13. The computer program product as recited in claim 12, wherein computer-executable instructions that, when executed, cause the computer system to analyze the configuration of input data to be provided to the at least one specified aspect of the higher level source code comprise computer-executable instructions that, when executed, cause the computer system to determine that the input data does not use buffer aliasing; and wherein computer-executable instructions that, when executed, cause the computer system to bind the specified lower level instructions to executable code to implement the intent of the at least one specified aspect of the higher level source code comprise computer-executable instructions that, when executed, cause the computer system to bind the one version of representative lower level instructions to executable code at runtime.

14. The computer program product as recited in claim 12, wherein the one version of representative lower level instructions and the other version of representative lower level instructions are both High Level Shader Language ("HLSL") shaders.

15. The computer program product as recited in claim 9, wherein computer-executable instructions that, when executed, cause the computer system to compile a plurality of different representative lower level instructions for the at least one specified aspect comprise computer-executable instructions that, when executed, cause the computer system to:

compile an abstract interface to represent the at least one specified aspect; and compile a plurality of different portions of lower level code that can be dynamically linked to the abstract interface at runtime.

16. The computer program product as recited in claim 15, wherein computer-executable instructions that, when executed, cause the computer system to compile an abstract interface to represent the at least one specified aspect comprise computer-executable instructions that, when executed, cause the computer system to compile a physical to logical thread ID mapping interface; and wherein computer-executable instructions that, when executed, cause the computer system to compile a plurality of different portions of lower level code that can be dynamically linked to the abstract interface at runtime comprise computer-executable instructions that, when executed, cause the computer system to:

compile one portion of lower level code for direct physical to logical thread ID mapping; and compile another portion of lower level code for the more general indirect physical to logical thread ID mapping.

17. The computer program product as recited in claim 15, wherein computer-executable instructions that, when executed, cause the computer system to analyze the configuration of input data to be provided to the at least one aspect of the higher level source code comprise computer-executable instructions that, when executed, cause the computer system to determine that the input data using direct physical to logical thread ID mapping; and wherein computer-executable instructions that, when executed, cause the computer system to bind the specified lower level instructions to executable code to implement the intent of the at least one aspect of the higher level source code comprises computer-executable instructions that, when executed, cause the computer system to dynamically link the one portion of lower level code to the physical to the logical thread ID mapping interface at runtime.

18. A computer system, the computer system comprising:
one or more processors;
system memory; and
one or more computer storage devices having stored thereone computer-executable instructions representing a code analyzer, a compiler, and a runtime, wherein the code analyzer is configured to: access statements and expressions of higher level source code;

detect that the higher level source code includes at least one specified aspect that varies to a requisite extent dependent upon the runtime configuration during execution; and indicate the identified at least one aspect to the compiler; wherein the compiler is configured to: receiving the indication of the identified at least one aspect;

access the statements and expressions of the higher level code; and compile the statements and expressions of the accessed higher level source code into representative lower level instructions of the lower level code, including: compiling a plurality of different representative lower level instructions for the at least one specified aspect comprises: an act of compiling an abstract interface to represent the at least one specified aspect; and an act of compiling a plurality of different portions of lower level code that can be dynamically linked to the abstract interface at runtime, each of the plurality of different representative lower level instructions configured to correctly implement the intent of the at least one specified aspect, each of the plurality of different representative lower level instructions configured for execution on a different runtime configuration; and wherein the runtime is configured to: analyze the runtime configuration to be utilized during execution;

determine that specified representative lower level instructions, selected from among the plurality of different representative lower level instructions, are configured for execution based on the provided runtime configuration; and bind the specified lower level instructions to executable code to implement the intent of the at least one specified aspect of the higher level source code.

19. The computer system as recited in claim 18, wherein the statements and expressions are statements and expression of C++ extended for parallel environments and wherein the plurality of different representative lower level instructions are High Level Shader Language ("HLSL") instructions.

* * * * *